US008752506B2

(12) United States Patent
Bagnall

(10) Patent No.: US 8,752,506 B2
(45) Date of Patent: Jun. 17, 2014

(54) AQUATIC FEEDING DEVICE

(75) Inventor: Gary Wayne Bagnall, Arroyo Grande, CA (US)

(73) Assignee: Zoo Med Laboratories Inc, San Luis Obispo, CA (US)

( * ) Notice: Subject to any disclaimer, the term of this patent is extended or adjusted under 35 U.S.C. 154(b) by 355 days.

(21) Appl. No.: 13/346,022

(22) Filed: Jan. 9, 2012

(65) Prior Publication Data
US 2013/0174786 A1 Jul. 11, 2013

(51) Int. Cl.
*A01K 5/00* (2006.01)
*A01K 29/00* (2006.01)

(52) U.S. Cl.
USPC .................................. 119/51.04; 119/230

(58) Field of Classification Search
CPC ...... A01K 97/02; A01K 61/02; A01K 61/025
USPC ........................ 119/51.04, 230, 702; 43/44.99
See application file for complete search history.

(56) References Cited

U.S. PATENT DOCUMENTS

| 1,471,885 | A | * | 10/1923 | Dessau | 446/153 |
| 2,842,890 | A | * | 7/1958 | Goroni | 43/55 |
| 3,512,505 | A | * | 5/1970 | Cross et al. | 119/51.04 |
| 3,769,740 | A | * | 11/1973 | Lang | 43/44.99 |
| 3,974,591 | A | * | 8/1976 | Ray | 43/43.14 |
| 3,990,172 | A | * | 11/1976 | Hagquist | 43/43.14 |
| 3,993,028 | A | * | 11/1976 | Baensch et al. | 119/51.04 |
| 4,065,870 | A | * | 1/1978 | Muko | 43/44.99 |
| 4,267,658 | A | * | 5/1981 | Brown et al. | 43/42.06 |
| 4,924,620 | A | * | 5/1990 | Kimberley | 43/44.9 |
| 5,791,285 | A | * | 8/1998 | Johnson | 119/51.04 |
| 6,109,210 | A | * | 8/2000 | Nasser | 119/51.04 |
| 2006/0174537 | A1 | * | 8/2006 | Woodham et al. | 43/44.99 |
| 2008/0000140 | A1 | * | 1/2008 | Mitchell et al. | 43/42.06 |
| 2010/0116217 | A1 | * | 5/2010 | Allis | 119/264 |

* cited by examiner

*Primary Examiner* — Kimberly Berona
(74) *Attorney, Agent, or Firm* — Welsh Flaxman & Gitler LLC

(57) ABSTRACT

An aquatic feeding device includes a hollow body having an exterior wall, the exterior wall including an exterior surface defining an external shape of the feeding device and an interior surface defining an inner cavity of the feeding device. The hollow body includes an upper end and a lower end. An air tight chamber is formed within the inner cavity of the feeding device adjacent the upper end of the hollow body. A plurality of feeding apertures are formed within the exterior wall adjacent the air tight chamber. The plurality of feeding apertures are shaped and dimensioned to permit pets with access to the inner cavity of the feeding device.

15 Claims, 3 Drawing Sheets

AQUATIC FEEDING DEVICE

BACKGROUND OF THE INVENTION

1. Field of the Invention

The invention relates to an aquatic feeding device. More particularly, the invention relates to a feeding device adapted for feeding turtles or fish within a pond or aquarium environment.

2. Description of the Related Art

Turtle and fish owners commonly feed their turtles or fish by simply dropping food pellets into the aquatic environment, such as an aquarium or pond, and allowing the turtles or fish to eat the freely floating pellets as they wish. This, however, does not add to the enrichment or exercise of the turtle or fish. The present invention has, therefore, been developed to provide turtle or fish owners with a feeding device that not only provides turtles or fish with nourishment, but also provides the turtles or fish with enrichment and exercise.

SUMMARY OF THE INVENTION

It is, therefore, an object of the present invention to provide an aquatic feeding device for aquariums and ponds including a hollow body having an exterior wall, the exterior wall including an exterior surface defining an external shape of the feeding device and an interior surface defining an inner cavity of the feeding device. The hollow body includes an upper end and a lower end. An air tight chamber is formed within the inner cavity of the feeding device adjacent the upper end of the hollow body. A plurality of feeding apertures are formed within the exterior wall adjacent the air tight chamber. The plurality of feeding apertures are shaped and dimensioned to permit pets with access to the inner cavity of the feeding device.

It is also an object of the present invention to provide a feeding device including a filling access port formed within the hollow body.

It is another object of the present invention to provide a feeding device including an access port cover selectively covering the filling access port.

It is a further object of the present invention to provide a feeding device wherein the hollow body is in the shape of a fish.

It is also an object of the present invention to provide a feeding device wherein the hollow body is provided with a first lateral side wall and a second lateral side wall, and the plurality of feeding apertures are formed in both the first lateral side wall and the second lateral side wall.

It is another object of the present invention to provide a feeding device wherein the air tight chamber is positioned so as to extend from a position adjacent a tail end of the feeding device to a position approximately along a longitudinal center of the feeding device.

It is a further object of the present invention to provide a feeding device wherein the hollow body is provided with a first lateral side wall and a second lateral side wall. The air tight chamber is defined by the exterior wall in an area along the upper end where the first lateral side wall and the second lateral side wall of the hollow body meet to form an upper edge of the hollow body.

It is also an object of the present invention to provide a feeding device wherein the air tight chamber is further defined by a chamber plate extending from the first lateral side wall to the second lateral side wall.

It is another object of the present invention to provide a feeding device wherein the chamber plate extends between the upper edge at a longitudinal center of the feeding device and the upper edge adjacent a tail end of the feeding device.

It is a further object of the present invention to provide a feeding device wherein the plurality of feeding apertures is formed adjacent the chamber plate opposite the air tight chamber.

It is also an object of the present invention to provide a feeding device wherein the plurality of feeding apertures are formed in both the first lateral side wall and the second lateral side wall.

It is another object of the present invention to provide a feeding device wherein the hollow body is translucent.

It is a further object of the present invention to provide a feeding device wherein the feeding apertures are elongated slots.

It is also an object of the present invention to provide a feeding device wherein the feeding apertures are 8 mm wide by 15 mm long.

Other objects and advantages of the present invention will become apparent from the following detailed description when viewed in conjunction with the accompanying drawings, which set forth certain embodiments of the invention.

DESCRIPTION OF THE PREFERRED EMBODIMENT

Figure 1:
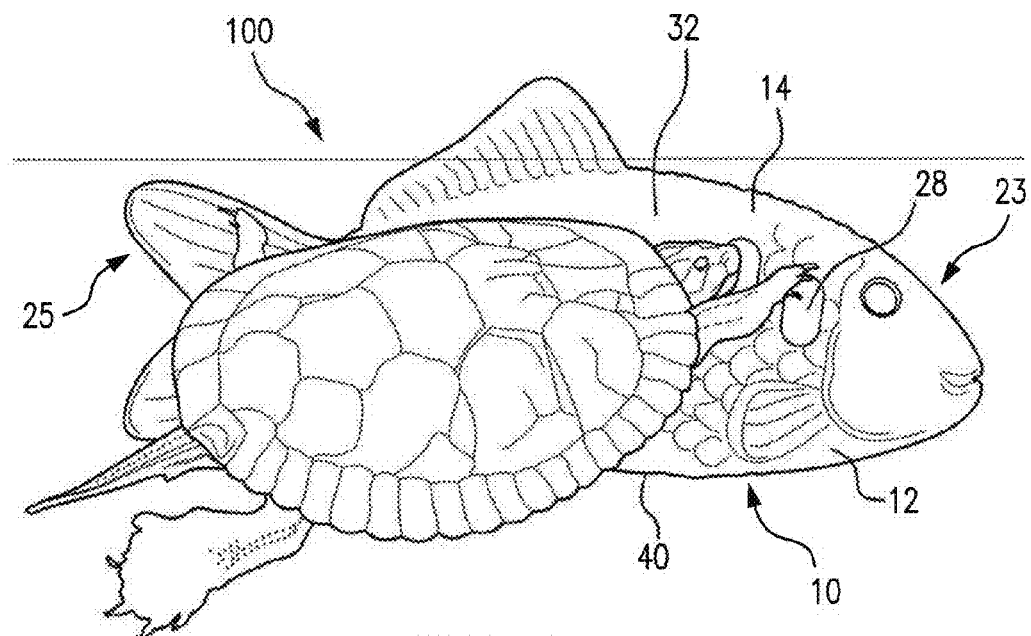
FIG. 1 is a perspective view of the present feeding device within water with a turtle accessing food through the feeding apertures.
Figure 2:
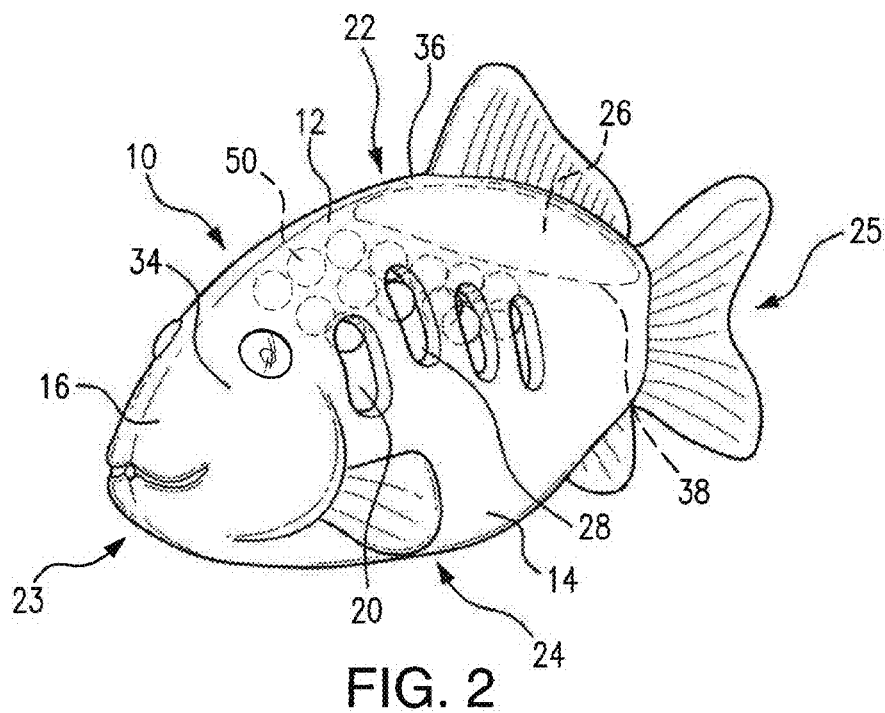
FIG. 2 is a perspective view of the present feeding device.
Figure 3:
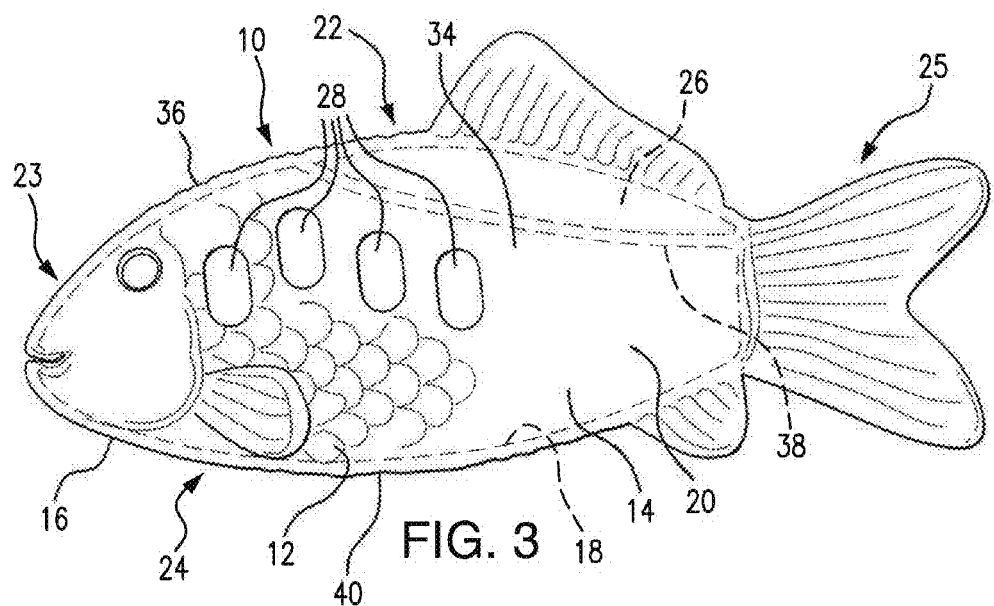
FIG. 3 is a side view of the present feeding device.
Figure 4:
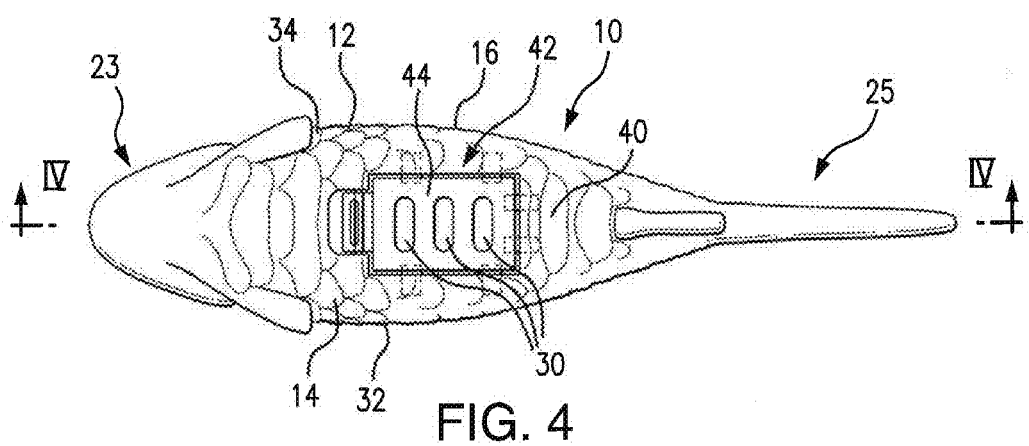
FIG. 4 is a bottom view of the present feeding device.
Figure 5:
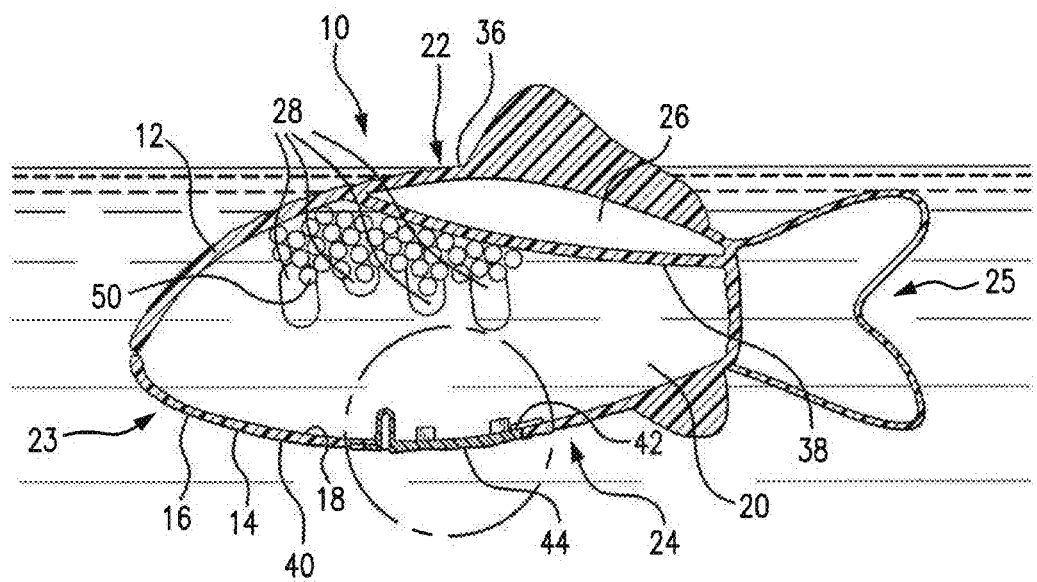
FIG. 5 is a cross sectional view along the line IV-IV, that is, the sagittal plane, in FIG. 4 of the feeding device.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to FIGS. 1 to 7, an aquarium feeding device 10 is disclosed. The feeding device 10 is particularly adapted for feeding turtles; although it is appreciated it may be useful in feeding other pets kept in an aquarium environment. The feeding device 10 generally includes a hollow body 12 having an exterior wall 14. The exterior wall 14 includes an exterior surface 16 defining the external shape of the feeding device 10 and an interior surface 18 defining an inner cavity 20 of the feeding device 10. The hollow body 12 also includes an upper end 22 and a lower end 24, as well as a front end 23 and a rear end 25. An air tight chamber 26 is formed within the inner cavity 20 of the feeding device 10 adjacent the upper end 22 of the hollow body 12. A plurality of feeding apertures 28 are formed within the exterior wall 14 adjacent the air tight chamber 26, the feeding apertures 28 being shaped and dimensioned to permit pets with access to the contents of the inner cavity 20 of the feeding device 10 either by poking their head into the inner cavity 20 or bumping into the feeding device 10 to cause food to move through the feeding apertures 28 and out of the inner cavity 20. In addition, a plurality of fluid flow apertures 30 is formed in the lower end 24 of the hollow body 12.

As briefly mentioned above, the feeding device 10 includes a hollow body 12 having an exterior wall 14. In accordance with a preferred embodiment, the hollow body 12 is preferably in the shape of a fish. It is, however, appreciated the hollow body could be in the shape of a turtle, log or the like, depending upon the pet and the desired aesthetics. The exterior wall 14, therefore, includes an exterior surface 16 defining a fish shaped feeding device 10 with an inner cavity 20 defined by the interior surface of the exterior wall 14. As the hollow body 12 takes the form of a fish, the front end 23 may also be thought of as the mouth end and the rear end 25 may be thought of as the tail end of the feeding device 10.

In accordance with a preferred embodiment, the hollow body 12 is transparent and is manufactured from a buoyant plastic material. In accordance with a preferred embodiment, the hollow body is translucent orange allowing the turtles to see the food contained therein. The orange color simulates a goldfish and improves its visibility in the tank. It is appreciated, other colors such as green for a turtle or a light brown for a log can be used. Considering the hollow body 12 being in the shape of a fish for the purpose of describing a preferred embodiment, and further considering the sagittal plane of a fish or other hollow body, the hollow body 12 is provided with a first lateral side wall 32 and a second lateral side wall 34 which are substantially identical mirror images. The hollow body 12 is further provided with an upper end 22 and lower end 24. The upper end 22 is defined by that portion of the feeding device 10 that sits vertically above the lower end 24 when the feeding device 10 is positioned within water 100 as discussed below; that is, the upper end 22 is that portion of a fish that would be considered the dorsal side, thereof. Similarly, the lower end 24 is defined by that portion of the feeding device 10 that sits vertically below the upper end 22 when the feeding device 10 is positioned within water as discussed below; that is, the lower end 24 is that portion of a fish that would be considered the ventral side thereof.

At least one air tight chamber 26 is formed within the inner cavity 20 of the feeding device 10 adjacent the upper end 22 of the hollow body 12. In accordance with a preferred embodiment, the air tight chamber 26 is positioned so as to extend from a position adjacent the tail end 25 of the feeding device to a position approximately along the longitudinal center of the feeding device 10. In this way, the feeding device 10 is balanced to resemble a standard fish when in the water 100; that is, the feeding device floats without the head up and/or tail up.

The air tight chamber 26 is defined by the exterior wall 14 in the area along the upper end 22 where the first lateral side wall 32 and the second lateral side wall 34 of the hollow body 12 meet to form the upper edge 36 of the hollow body 12. This portion of the hollow body 12 is closed off to form the air tight chamber 26 by a chamber plate 38 extending from the first lateral side wall 32 to the second lateral side wall 34, and between the upper edge 36 at the longitudinal center and the upper edge 36 adjacent the tail end 24, such that the air tight chamber 26 is formed. The chamber plate 38 extends completely from the first lateral side wall 32 to the second lateral side wall 34 such that the air tight chamber 26 is sealed from the remainder of the inner cavity 20. As such, the air tight cavity 26 is defined by a portion of the first lateral side wall 32 adjacent the upper edge 36 of the hollow body 12, a portion of the second lateral side wall 34 adjacent the upper edge 36 of the hollow body 12, and the chamber plate 38.

As will be appreciated based upon the following discussion, the air tight chamber 26 provides directed buoyancy in the hollow body 12 which maintains the hollow body 12 in a desired upright orientation that is, with the dorsal side extending upward. In particular, because the remainder of the inner cavity 20 will fill with water 100, the air tight chamber 26 will have less mass than either the water in which it sits or the water within the inner cavity 20, and the air tight chamber 26 will therefore be directed upwardly within the water 100.

A plurality of feeding apertures 28 are formed within the exterior wall 14 adjacent the air tight chamber 26. The feeding apertures 28 are formed in both the first lateral side wall 32 and the second lateral side wall 34 along the upper end 22 of the hollow body 12. The feeding apertures 28 are formed adjacent the chamber plate 38 opposite the air tight chamber 26. In accordance with a preferred embodiment, the upper edges of the feeding apertures 28 are approximately 4 mm from the chamber plate. The feeding apertures 28 are preferably elongated slots which are 8 mm wide by 15 mm long. These dimensions were selected so that the product would work with turtle food pellets. The size and shape of the feeding apertures can be altered to accommodate other sizes and shapes of food particles. It is intended that the feeding apertures not be sized to let the turtle stick its head into the feeding apertures as the turtles' head could get stuck. Rather, it is the intention of the feeding device that the feeding apertures be sized and shaped to allow the pellets to come out of the feeding apertures when the floating feeding device is bumped and tilted by the turtle. The feeding apertures 28 are shaped and dimensioned to permit turtles with access to pellets exiting from the inner cavity 20 of the feeding device 10.

Figure 6:
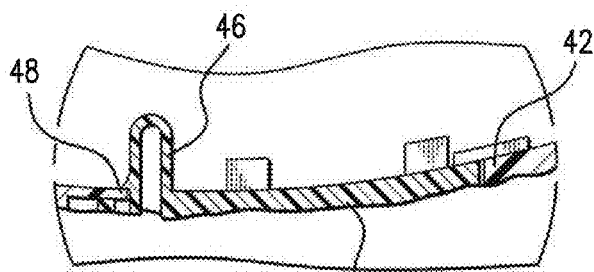
FIGS. 6 and 7 are details view showing opening of the filling access port along the bottom of the feeding device.
Figure 7:
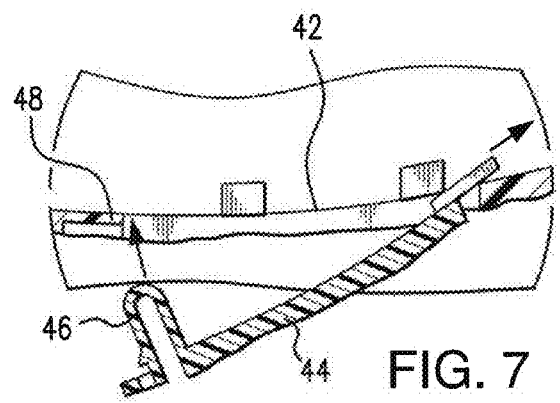

Referring to FIGS. 6 and 7, the hollow body 12 is also provided with a filling access port 42 along the bottom edge 40 of the hollow body 12, that is, along the meeting point of the first lateral side wall 32 and the second lateral side wall 34 of the hollow body 12. The filling access port 42 is shaped and dimensioned to permit the placement of food within the hollow body 12. The filling access port 42 is selectively covered by an access port cover 44. The access port cover 44 selectively fits over the filling access port 42 and is held in position via a resilient latch 46 that engages an edge 48 of the filling access port 42. A plurality of fluid flow apertures 30 are formed in the access port cover 44.

In practice, food 50 (for example, turtle food pellets) is passed through the filling access port 42 and the access port cover 44 is positioned over the filling access port 42 to retain the food 50 within the inner cavity 20 of the hollow body 12. The feeding device 10 is then partially submerged within an aquarium. Because of the air tight chamber 26, the feeding apertures 28 and the fluid flow apertures 30, the inner cavity 20 (with the exception of the air tight chamber 26) will fill with water while the air tight chamber 26 remains buoyant. This will cause the feeding device 10 to sit within the water with the air tight chamber 26 adjacent the upper surface of the water with the remainder of the hollow body 12 submerged. Because the turtle food 50 is more buoyant than the water, the food 50 will sit within the hollow body 12 at the upper end 22 thereof adjacent the chamber plate 38. This is where the feeding apertures 28 are formed allowing the turtles to access the food maintained therein.

In particular, the translucence of the hollow body 12 allows the turtles to see the food 50 therein. When the turtles come close to the feeding device 10, they bump into the feeding device 10 releasing the food, thus providing the turtles with enrichment and exercise as the turtles must work to get the food out of the feeding device 10. The food pellets 50 are not released until the feeding device 10 is bumped. When the feeding device 10 is stationary, the food pellets 50 remain "stuck" between the upper edges of the apertures 28 and the bottom of the chamber plate 38, that is, the bottom of the air tight chamber 26. When bumped, the angle of the feeding device 10 changes and the food pellets 50 are then able to float out of the feeding apertures 28 as the position of the food pellets 50 inside change in relation to the feeding apertures 28. Only a small change in the angle of the feeding device 10 is needed to allow some of the food pellets 50 to escape. Since the floating feeding device 10 quickly rights itself, only some of the food pellets 50 escapes when bumped, and the remainder is again trapped after it returns to an upright position. With each subsequent "bump," more food pellets 50 are released until it runs out.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An aquatic feeding device, comprising:
 a hollow body having a dorsal fin with a first end and a second end and a tail fin on an end of the hollow body adjacent the second end of the dorsal fin, the hollow body including an exterior wall, the exterior wall including an exterior surface defining an external shape of the feeding device and an interior surface defining an inner cavity of the feeding device;
 the hollow body including an upper end and a lower end, and an air tight chamber is formed within the inner cavity of the feeding device adjacent the upper end of the hollow body and wherein the air tight chamber is defined within a top portion of the hollow body and extending diagonally from a mid-portion anterior to the dorsal fin diagonally to a rear portion adjacent the tail fin;
 a plurality of feeding apertures formed within the exterior wall adjacent the air tight chamber, the plurality of feeding apertures being shaped and dimensioned to permit pets with access to the inner cavity of the feeding device.

2. The feeding device according to claim 1, further including a filling access port formed within the hollow body.

3. The feeding device according to claim 2, further including an access port cover selectively covering the filling access port.

4. The feeding device according to claim 1, wherein the hollow body is in the shape of a fish.

5. The feeding device according to claim 1, wherein the hollow body is provided with a first lateral side wall and a second lateral side wall, and the plurality of feeding apertures are formed in both the first lateral side wall and the second lateral side wall.

6. The feeding device according to claim 1, wherein the air tight chamber is positioned so as to extend from a position adjacent a tail end of the feeding device to a position approximately along a longitudinal center of the feeding device.

7. The feeding device according to claim 1, wherein the hollow body is provided with a first lateral side wall and a second lateral side wall, the air tight chamber is defined by the exterior wall in an area along the upper end where the first lateral side wall and the second lateral side wall of the hollow body meet to form an upper edge of the hollow body.

8. The feeding device according to claim 7, wherein the air tight chamber is further defined by a chamber plate extending from the first lateral side wall to the second lateral side wall.

9. The feeding device according to claim 8, wherein the chamber plate extends between the upper edge at a longitudinal center of the feeding device and the upper edge adjacent a tail end of the feeding device.

10. The feeding device according to claim 8, wherein the plurality of feeding apertures are formed adjacent the chamber plate opposite the air tight chamber.

11. The feeding device according to claim 10, wherein the plurality of feeding apertures are formed in both the first lateral side wall and the second lateral side wall.

12. The feeding device according to claim 1, wherein the hollow body is translucent.

13. The feeding device according to claim 1, wherein the feeding apertures are elongated slots.

14. The feeding device according to claim 13, wherein the feeding apertures are 8 mm wide by 15 mm long.

15. The feeding device according to claim 1, wherein the apertures are sized to allow the food to exit the feeding device when the feeding device is bumped by a pet.

* * * * *